Patented Apr. 26, 1949

2,468,345

UNITED STATES PATENT OFFICE 2,468,345

PLASTICIZING OF POLYVINYL ALCOHOL COMPOSITIONS

Charles Arthur Porter, Belleville, N. J., assignor to Resistoflex Corporation, Belleville, N. J., a corporation of New York No Drawing. Application January 5, 1946, Serial No. 639,427

4 Claims. (Cl. 260—29.6)

This invention relates to the making of plasticized polyvinyl alcohol compositions, more particularly those which are formed by extrusion or molding.

The term "polyvinyl alcohol" as used herein includes, in addition to substantially pure polyvinyl alcohol, which may be of different degrees of polymerization, all of the water-soluble products resulting from the partial hydrolysis of polyvinyl esters and water-soluble partial derivatives of polyvinyl alcohol however formed. Tests performed on various grades of polyvinyl alcohol have shown the invention to be generally applicable to this class of compounds, when using either one grade or a mixture of grades.

Polyvinyl alcohol compositions, by reason of their flexibility, toughness, resistance to organic solvents and other advantageous properties are highly useful in various arts in the manufacture of such articles as tubing, hose, gaskets, washers, diaphragms and other extruded and molded articles of many diverse types.

In making such articles, it is often necessary to provide polyvinyl alcohol compositions which simultaneously meet several different requirements, including the following: cold resistance or retention of flexibility at exceedingly low temperatures; minimum exudation of plasticizer, particularly under conditions of high humidity at elevated temperatures; adequate flowability of the compositions under the conditions encountered in extrusion and molding operations; minimum shrinkage of the material with aging, especially at elevated temperatures; minimum swelling and loss of tensile strength on exposure to water, which is a solvent for polyvinyl alcohol; compatibility of the ingredients as indicated by stability of the composition, lack of which results in changes in its physical and chemical characteristics.

In order to produce compositions having overall acceptability for the various uses and meeting the requirements mentioned above, it has been found that there are certain relationships which must be met with respect to the blending of various plasticizers with each other and with the polyvinyl alcohol. In this connection, important discoveries have been made relating to the use of plasticizers consisting of (a) ethanol formamide and water or (b) ethanol formamide, certain polyhydric alcohols and water, particularly with reference to the ratios to be maintained between the aforesaid components of the plasticizer. It has surprisingly been discovered that by maintaining the proper ratios it becomes possible to use greatly increased quantities of plasticizer, relative to the quantity of polyvinyl alcohol, thereby obtaining significant advantages.

In accordance with the invention, the plasticizer comprises (a) ethanol formamide and water or (b) a combination of ethanol formamide, a polyhydric alcohol containing not over 6 carbon atoms and water. In the latter case the ethanol formamide should be at least 60% of the combined quantities of ethanol formamide and polyhydric alcohol. In both cases the water should bear a certain ratio of the other components of the plasticizer as hereinafter disclosed.

The polyhydric alcohol containing not over six carbon atoms may be glycerol, ethylene glycol, propylene glycol, dipropylene glycol, 1,3 butylene glycol, diethylene glycol, sorbitol or mannitol, or mixtures thereof. These may be used, singly or in admixture, together with ethanol formamide as the first component of the plasticizer, with water as the second component. An important aspect of the invention resides in the discovery that the ratio between the first component and the second component should be between about 2 to 1 and about 4 to 1. When the proportions are maintained within these limits it has been found to be possible to use greatly increased quantities of plasticizer thus obtaining a greatly increased plasticizing effect, greater flexibility, greater cold resistance and better flowing properties. These advantages, moreover, are obtained with reduced exudation, by comparison with compositions where the proper ratios, as above explained, are not observed.

It is recognized that it is not new to use ethanol formamide in polyvinyl alcohol compositions. It is disclosed in Watkins Patent No. 2,250,664, as a softening agent for films produced by evaporation of an aqueous 15% polyvinyl alcohol solution, the softening agent being used in the amount of from 11% to 12%, based on the polyvinyl alcohol. The minimum water retained in such flexible films would be greatly in excess of the softening agent so that the ratio of softening agent to water would be far below the minimum ratio of this invention. Ethanol formamide is also disclosed in Dangelmajer Patent No. 2,340,866 as a blending agent to render more compatible the ingredients of various polyvinyl alcohol compositions, but the ratios of ethanol formamide, or the other blending agents disclosed, to water do not remotely approach the minimum ratio of this invention. It will be seen that these patents neither show nor suggest the ratios, relationships or relative proportions of ethanol formamide to water described and claimed herein.

Heretofore the maximum amount of ethanol formamide which it was practicable to use in a polyvinyl alcohol composition, without excessive exudation resulting, was about 30%, based on the polyvinyl alcohol. By this invention ethanol formamide may be incorporated, without deleterious effects, in much higher amounts. It will be appreciated that the amount used will depend on the qualities it is desired to obtain in the product.

The maximum useful amounts which can be employed will vary with the type of polyvinyl alcohol used in the composition and, with this factor in mind, it may be stated generally that ethanol formamide may be incorporated, by reason of the present discovery, in amounts of from 100% to 200% of the polyvinyl alcohol.

It is to be understood that water acts as a plasticizer in polyvinyl alcohol compositions. It is the best known solvent for polyvinyl alcohol and it acts as a solvent-type plasticizer when retained in the composition.

As heretofore indicated, a portion of the ethanol formamide may be replaced by certain polyhydric alcohols, up to about 40% of the ethanol formamide. This partial substitution may produce further advantageous results for the reason that these polyhydric alcohols are, in general, better solvents for polyvinyl alcohol than ethanol formamide and therefore improve the plasticizer retention without producing any serious deterioration in other respects. With such substitution within the stated limit, the beneficial effects resulting from maintenance of the proper ratio of water to the other plasticizers remain the same.

For a better understanding of the invention and to show how it may be carried out in practice, reference may be had to the following specific examples, which are to be construed as illustrative and not as limitations of the invention.

*Example 1*

Compositions were prepared having the general formula:

| | Parts |
|---|---|
| Polyvinyl alcohol (completely saponified) | 100 |
| Ethanol formamide (A); water (B) | 100 |

Various compositions were made in which the ratios of component A to component B were 1:1, 2:1, 3:1, 4:1, 6:1, 9:1 and 1:0.

The 1:1 ratio yielded a composition having excessive shrinkage, and relatively poor water and cold resistance.

Ratios of 2:1, 3:1 and 4:1 proved excellent in obtaining maximum cold resistance, water resistance, flow or extrudability, and minimum shrinkage.

The use of 6:1, 9:1 and 1:0 ratios introduced progressively increasing exudation as the ratios were increased, leading to severe exudation in the case of the 1:0 ratio where no water was used. Flow, cold resistance and water resistance properties were also greatly diminished.

Compatibility, as determined in part by the above observations and in part from the appearance of the specimens as to uniformity, clarity, etc., was noted as being maximum for those compositions plasticized with components A and B within the range of ratios from 2:1 to 4:1.

*Example 2*

Compositions were prepared having the following general formula:

| | Parts |
|---|---|
| Polyvinyl alcohol (completely saponified) | 100 |
| Ethanol formamide (A); water (B) | 150 |

For these compositions, component A was varied with respect to component B in the ratios 1:1, 2:1, 3:1, 4:1, 6:1, 14:1 and 1:0.

Shrinkage was prohibitive in the composition having a 1:1 ratio of components A and B. This also caused diminished cold resistance in extruded tubing covered with cotton braid bonded to the tubing because of strains set up in the structure by shrinkage.

Compositions prepared with ratios of 2:1, 3:1 and 4:1, yielded acceptable over-all improvement of such characteristics as cold resistance, water resistance, flow or extrudability, exudation and compatibility.

The use of ratios of 6:1, 14:1 and 1:0 resulted in increased exudation, decreased flow and diminished compatibility.

*Example 3*

Compositions were prepared having the following general formula:

| | Parts |
|---|---|
| Polyvinyl alcohol (completely saponified) | 100 |
| Ethanol formamide, glycerol (A); water (B) | 160 |

Component A was 40% glycerol and 60% ethanol formamide. The ratios of components A to B used were as follows: 7:5, 2:1, 5:1, 14:1.

Results were similar to those obtained in Example 1. In general cold resistance was slightly lower. Exudation characteristics were even better than in Example 1. Compatibility and flow were slightly improved by the partial substitution of glycerol for ethanol formamide.

Compositions similar to Example 3 using, instead of glycerol, the other polyhydric alcohols containing not over six carbon atoms which have been referred to above, gave results comparable to those obtained with the compositions of Example 3 containing glycerol.

*Example 4*

To illustrate the extent of permissible polyhydric alcohol substitution for ethanol formamide, compositions having the following general formula were prepared:

| | Parts |
|---|---|
| Polyvinyl alcohol (completely saponified) | 100 |
| Water | 40 |
| Ethanol formamide polyhydric alcohol | 120 |

The polyhydric alcohols used were glycerol, ethylene glycol, propylene glycol, dipropylene glycol, 1,3 butylene glycol, diethylene glycol, sorbitol and mannitol. Each was substituted for a portion of the ethanol formamide to the extent of 17%, 33%, 40%, and 50% and it was found that 40% represented a limit above which desirable properties, such as cold resistance, water resistance and decreased shrinkage, obtained with ethanol formamide alone, were markedly decreased or diminished. Below about 40% no decrease was noted.

While the foregoing Examples describe compositions in which the polyvinyl alcohol was of the "Type B" or completely saponified grade, it has been found that the same results are obtained with other grades, such as "Type A" or incompletely saponified polyvinyl alcohols, and with blends of various grades.

It will thus be seen that without changing the total amount of plasticizer in the composition significant improvements result from the use of ratios, as between the components of the plasticizer, falling within a certain defined range.

The practice of the present invention does not preclude the presence in polyvinyl alcohol compositions of plasticizers other than those specifically referred to or other modifying, stabilizing, coloring, filling or blending agents and the like.

The foregoing detailed description is to be taken as illustrative merely and not as limiting the invention defined in the appended claims.

What is claimed is:

1. A polyvinyl alcohol composition comprising, as plasticizer, a first component of the group consisting of (a) ethanol formamide and (b) ethanol formamide and not over 40% of a polyhydric alcohol containing not over six carbon atoms, and a second component consisting of water, the ratio of said first component to said second component being within the range from 2:1 to 4:1, and the total amount of said plasticizer components being present in an amount by weight of from 100% to 300% of the polyvinyl alcohol.

2. A polyvinyl alcohol composition comprising, as plasticizer, ethanol formamide and water, the ratio of the ethanol formamide to the water being within the range from 2:1 to 4:1, and the total amount of said plasticizer being from 100% to 300% by weight of the polyvinyl alcohol.

3. A polyvinyl alcohol composition comprising, as plasticizer, a mixture of ethanol formamide and glycerol in which the glycerol is not over 40% of the mixture, and water, the ratio of said mixture to the water being within the range from 2:1 to 4:1, and the total amount of said plasticizer being from 100% to 300% by weight of the polyvinyl alcohol.

4. A polyvinyl alcohol composition comprising, as plasticizer, a mixture of ethanol formamide and polyhydric alcohol containing not over six carbon atoms in which said polyhydric alcohol is not over 40% of the mixture, and water, the ratio of said mixture to the water being within the range from 2:1 to 4:1, and the total amount of said plasticizer being from 100% to 300% by weight of the polyvinyl alcohol.

CHARLES ARTHUR PORTER.

REFERENCES CITED

The following references are of record in the file of this patent:

UNITED STATES PATENTS

| Number | Name | Date |
| --- | --- | --- |
| 2,177,612 | Schnabel | Oct. 24, 1939 |
| 2,340,866 | Dangelmajer | Feb. 8, 1944 |